US006968206B1

(12) United States Patent
Whitsey-Anderson

(10) Patent No.: US 6,968,206 B1
(45) Date of Patent: Nov. 22, 2005

(54) PORTABLE TELEVISION/CELLULAR PHONE DEVICE

(76) Inventor: Ivy Whitsey-Anderson, 1707 Langley Way, Hyattsville, MD (US) 20783

( * ) Notice: Subject to any disclaimer, the term of this patent is extended or adjusted under 35 U.S.C. 154(b) by 467 days.

(21) Appl. No.: 10/085,772

(22) Filed: Mar. 1, 2002

(51) Int. Cl.[7] .................................................. H04B 1/38
(52) U.S. Cl. ................................ 455/556.1; 455/161.2; 455/566; 345/348
(58) Field of Search .......................... 455/550.1, 161.2, 455/556, 566, 567, 557, 575, 556.1; 345/348, 345/339, 164; 379/93.12

(56) References Cited

U.S. PATENT DOCUMENTS

| | | | |
|---|---|---|---|
| 6,177,950 B1 * | 1/2001 | Robb | 348/14.01 |
| 6,373,501 B1 * | 4/2002 | Fiero | 345/700 |
| 6,459,906 B1 * | 10/2002 | Yang | 455/556.1 |
| 6,529,680 B1 * | 3/2003 | Broberg | 386/83 |
| 6,795,715 B1 * | 9/2004 | Kubo et al. | 455/556.1 |

* cited by examiner

*Primary Examiner*—Sonny Trinh
*Assistant Examiner*—Phuoc Doan

(57) ABSTRACT

A portable television/cellular phone device for providing a complete handheld entertainment center for a user. The portable television/cellular phone device includes a handheld housing having front, back, top, and side walls; and also includes a housing support member being hingedly attached to the handheld housing for standing up the handheld housing upon a surface; and further includes a display screen being disposed upon the front wall of the handheld housing; and also includes a phone reception/transmission assembly being disposed in the handheld housing and including a power supply being replaceably disposed in the handheld housing and also including an antenna being attached to the handheld housing; and further includes a television reception assembly being disposed in the handheld housing.

4 Claims, 5 Drawing Sheets

PORTABLE TELEVISION/CELLULAR PHONE DEVICE

BACKGROUND OF THE INVENTION

1. Field of the Invention

The present invention relates to combination portable televisions/cell phones and more particularly pertains to a new portable television/cellular phone device for providing a complete handheld entertainment center for a user.

2. Description of the Prior Art

The use of combination portable televisions/cell phones is known in the prior art. More specifically, combination portable televisions/cell phones heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,988,450; U.S. Pat. No. 6,122,526; U.S. Pat. No. 6,134,456; U.S. Pat. No. 6,131,042; U.S. Pat. No. 6,125,285; and U.S. Pat. No. Des. 361,288.

While these devices fulfill their respective, particular objectives and requirements, the aforementioned patents do not disclose a new portable television/cellular phone device. The prior art describes inventions including separate portable televisions and cell phones.

SUMMARY OF THE INVENTION

The general purpose of the present invention, which will be described subsequently in greater detail, is to provide a new portable television/cellular phone device which has many of the advantages of the combination portable televisions/cell phones mentioned heretofore and many novel features that result in a new portable television/cellular phone device which is not anticipated, rendered obvious, suggested, or even implied by any of the prior art combination portable televisions/cell phones, either alone or in any combination thereof. The present invention includes a handheld housing having front, back, top, and side walls; and also includes a housing support member being hingedly attached to the handheld housing for standing up the handheld housing upon a surface; and further includes a display screen being disposed upon the front wall of the handheld housing; and also includes a phone reception/transmission assembly being disposed in the handheld housing and including a power supply being replaceably disposed in the handheld housing and also including an antenna being attached to the handheld housing; and further includes a television reception assembly being disposed in the handheld housing. None of the prior art combines cell phone capabilities with television receiving and viewing capabilities.

There has thus been outlined, rather broadly, the more important features of the portable television/cellular phone device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new portable television/cellular phone device which has many of the advantages of the combination portable televisions/cell phones mentioned heretofore and many novel features that result in a new portable television/cellular phone device which is not anticipated, rendered obvious, suggested, or even implied by any of the prior art combination portable televisions/cell phones, either alone or in any combination thereof.

Still another object of the present invention is to provide a new portable television/cellular phone device for providing a complete handheld entertainment center for a user.

Still yet another object of the present invention is to provide a new portable television/cellular phone device that is easy and convenient to carry and use.

Even still another object of the present invention is to provide a new portable television/cellular phone device that allows the user to watch TV programs and make telephone calls on one handheld unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
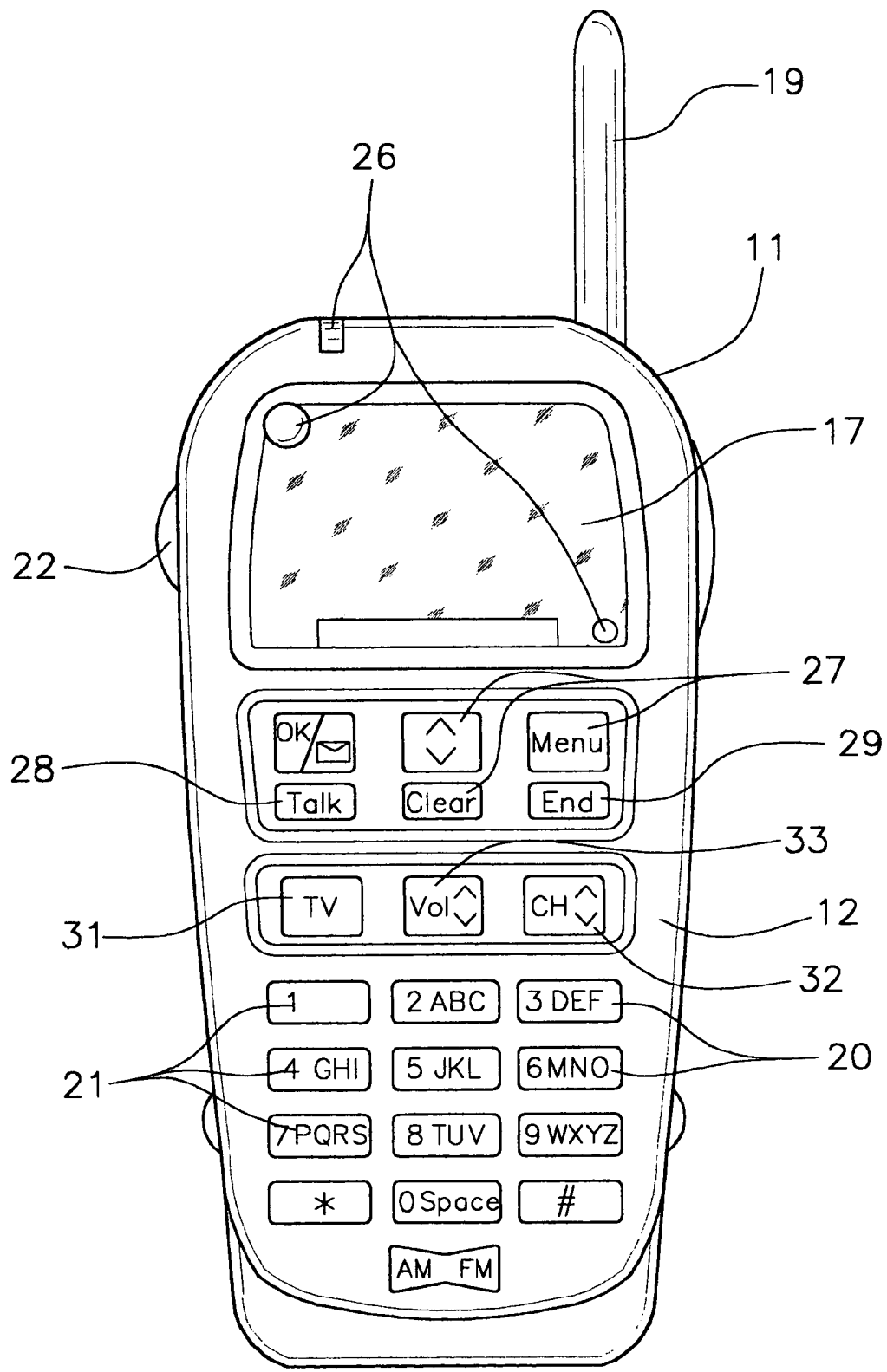
FIG. 1 is a front view of a new portable television/cellular phone device according to the present invention.
Figures 2, 3:
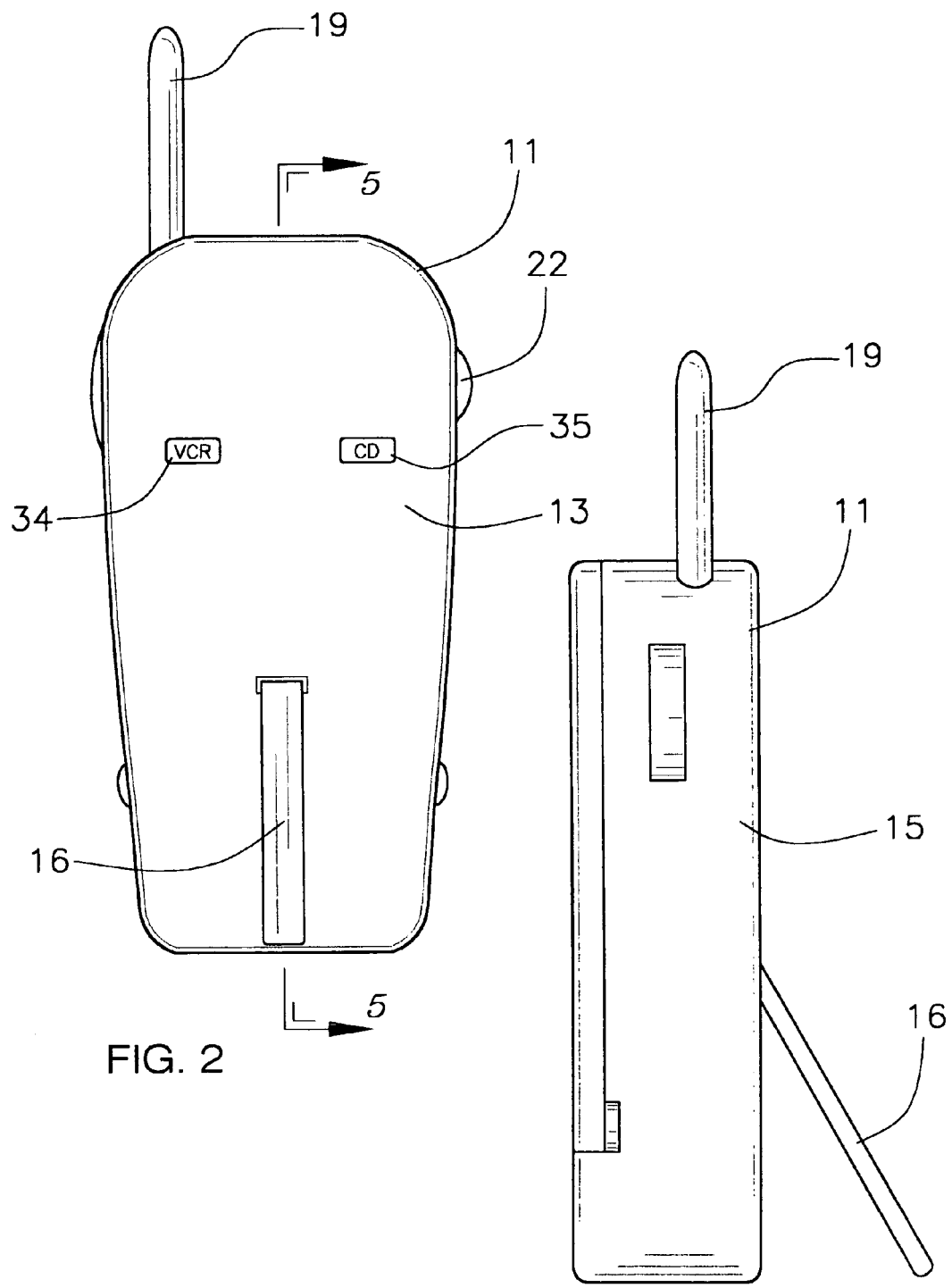
FIG. 2 is a back view of the present invention.
FIG. 3 is a side view of the present invention.
Figure 4:
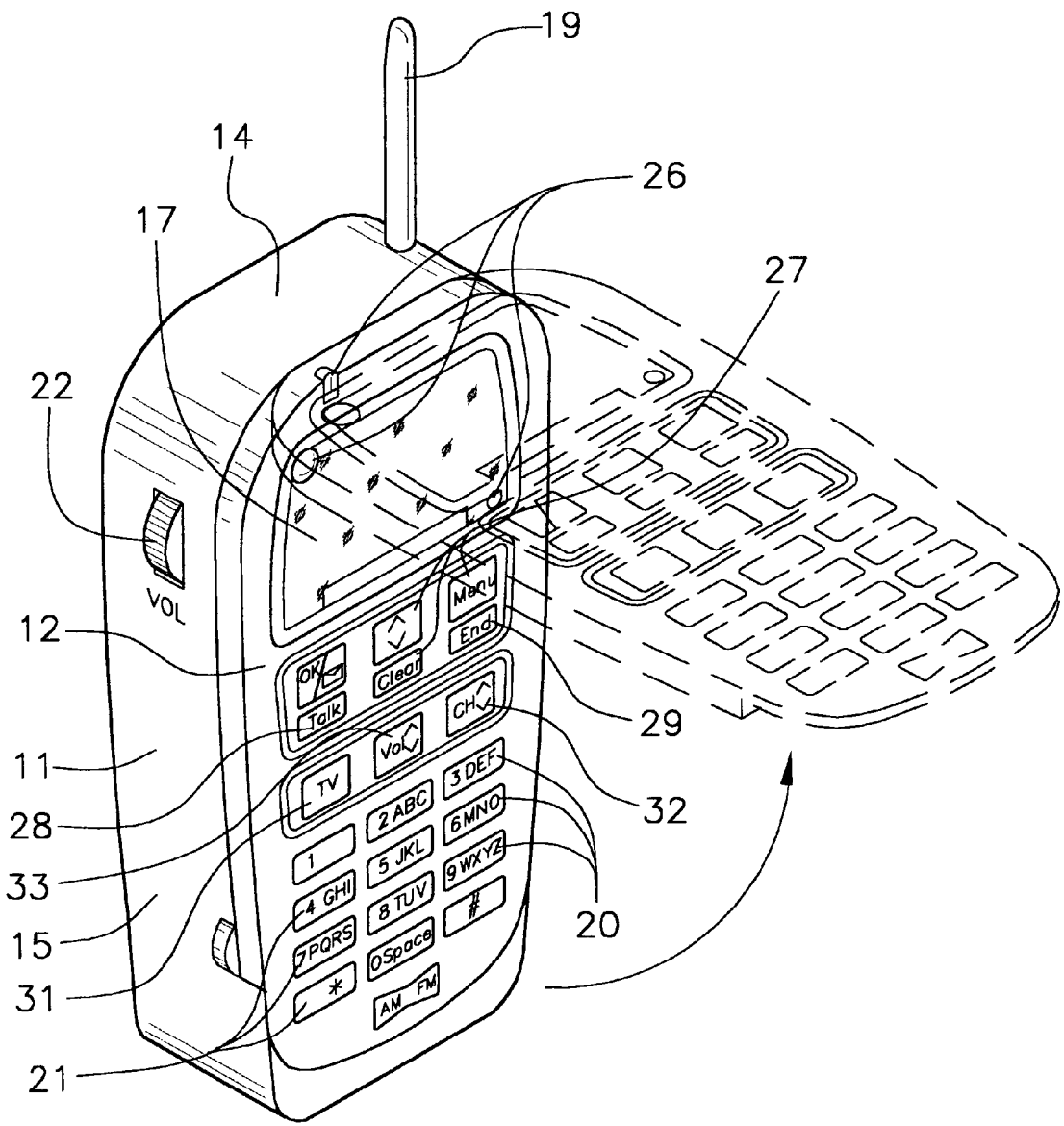
FIG. 4 is a perspective view of the present invention.
Figure 5:
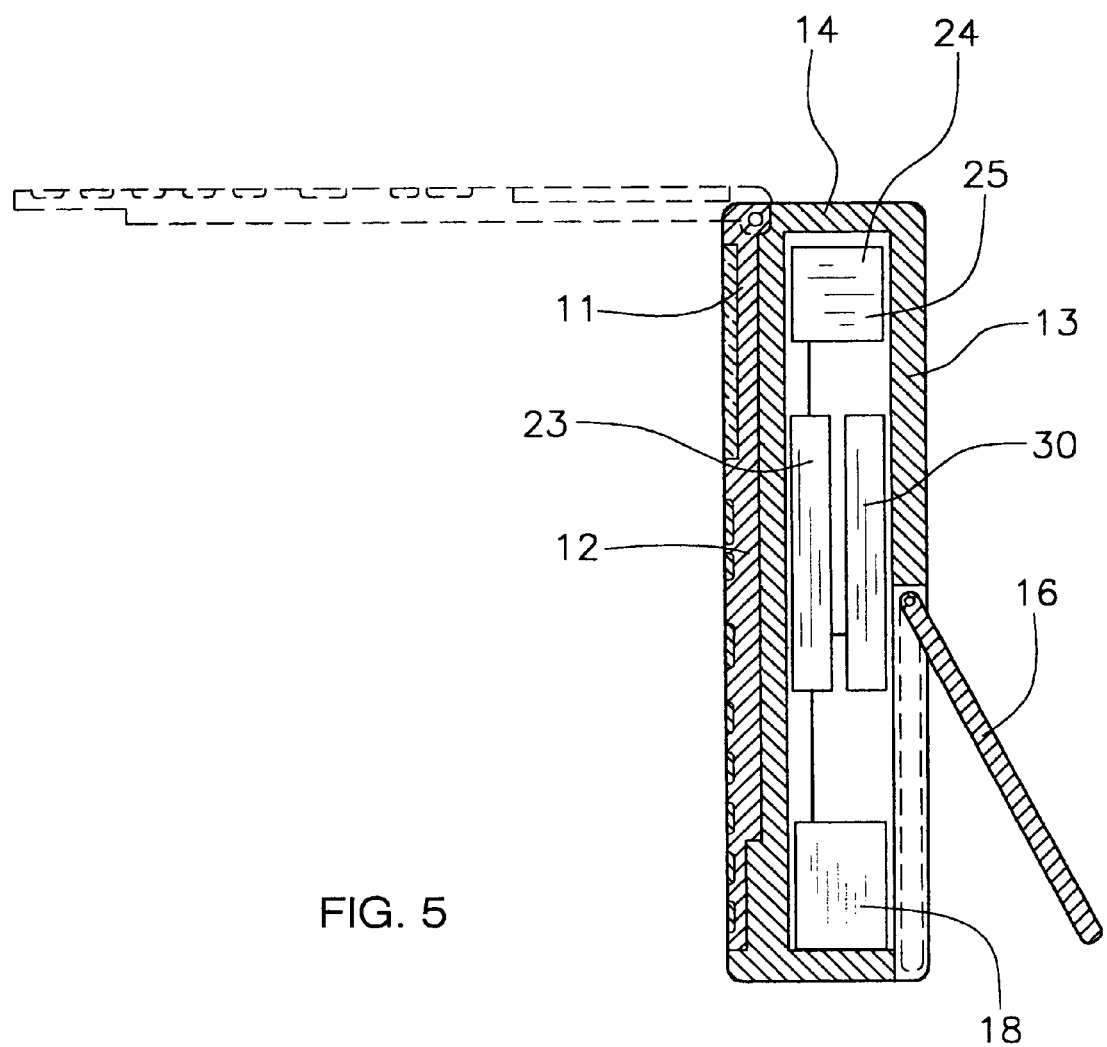
FIG. 5 is a cross-sectional view of the present invention.
Figure 6:
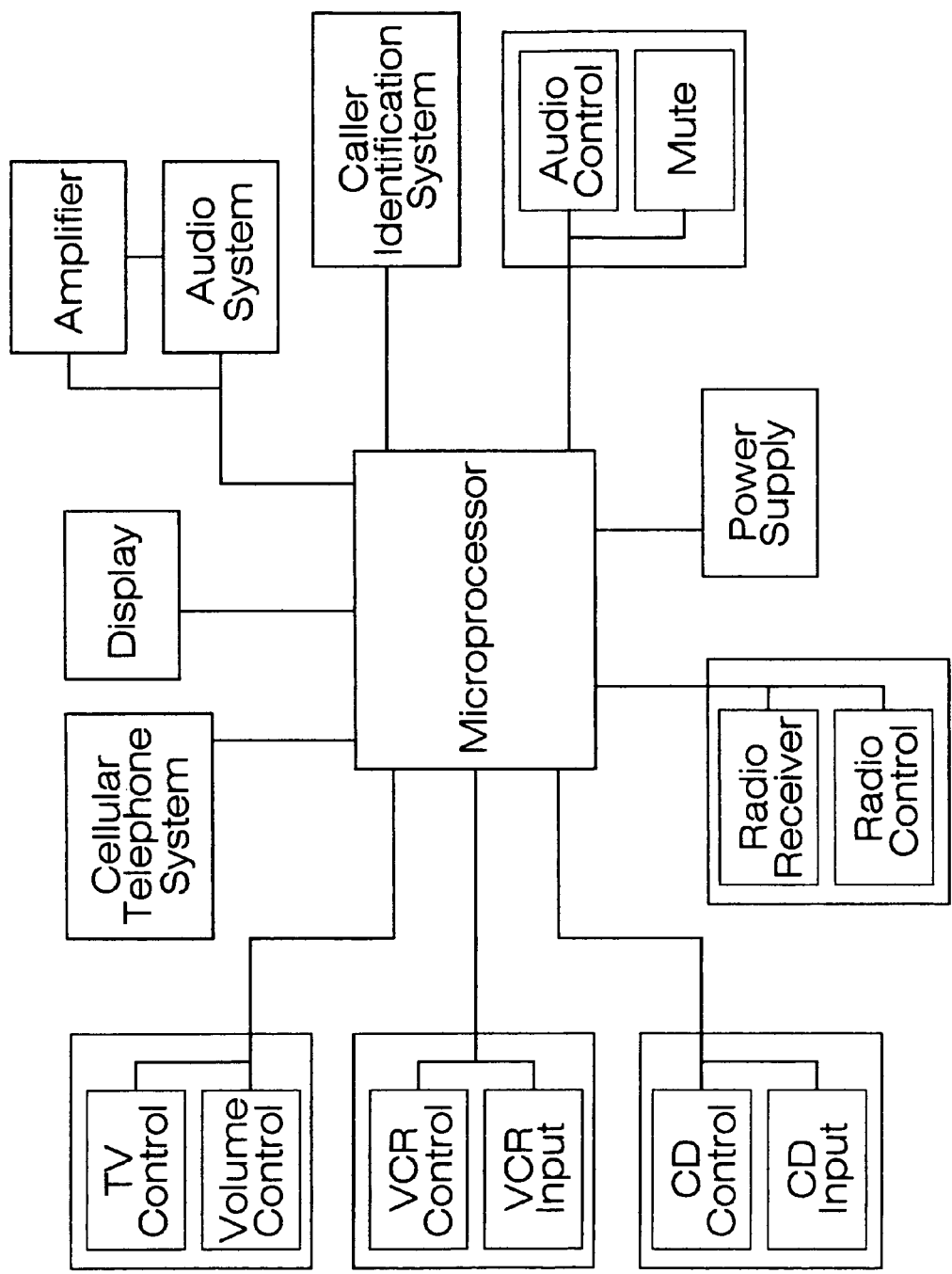
FIG. 6 is a schematic diagram of the present invention.

With reference now to the drawings, and in particular to FIGS. 1 through 6 thereof, a new portable television/cellular phone device embodying the principles and concepts of the present invention and generally designated by the reference numeral 10 will be described.

As best illustrated in FIGS. 1 through 6, the portable television/cellular phone device 10 generally comprises a handheld housing 11 having front, back, top, and side walls 12–15. A housing support member 16 is hingedly and conventionally attached to the handheld housing 11 for standing up the handheld housing 11 upon a surface. The housing support member 16 is generally a lever being hingedly attached to the back wall of the handheld housing 11. A display screen 17 is conventionally disposed upon the front wall 12 of the handheld housing 11.

A phone reception/transmission assembly is conventionally disposed in the handheld housing 11 and includes a power supply 18 being replaceably and conventionally disposed in the handheld housing 11 and also includes an antenna 19 being conventionally attached to the handheld housing 11. The phone reception/transmission assembly further includes a numbers/symbols keypad 20 being conventionally disposed upon the front wall 12 of the handheld housing 11 and includes a plurality of button-like switches 21 used to dial a phone number. The phone reception/transmission assembly also includes a power switch 22 being movably and conventionally disposed through one of the walls 12–15 of the handheld housing 11 and being conventionally connected to the power supply 18 which is a battery pack, and further includes a microprocessor 23 being conventionally disposed in the handheld housing 11 and being conventionally connected to the numbers/symbols keypad 20 and to the power switch 22 and to the power supply 18 and to the display screen 17 upon which data is displayed, and also includes a receiver 24 including a speaker being conventionally disposed in the handheld housing 11 for receiving radio waves through the antenna 19, and further includes a transmitter 25 being conventionally disposed in the handheld housing 11 for transmitting radio waves through the antenna 19, and also includes indicator lights 26 being conventionally disposed upon the display screen 17 and upon the handheld housing 11 for indicating power level for the battery pack and also displaying incoming calls. The phone reception/transmission assembly also includes function switches 27 being conventionally disposed upon the handheld housing 11 and being conventionally connected to the microprocessor 23 for selecting various telephone functions programmed in the microprocessor 23 such as caller ID which is displayable upon the display screen 17, and further includes a phone connect switch 28 being conventionally disposed upon the handheld housing 11 and being conventionally connected to the receiver 24 and the transmitter 25 for receiving and transmitting phone calls, and also includes a phone disconnect switch 29 being conventionally connected to the receiver 24 and the transmitter 25 for disconnecting phone calls.

A television reception assembly is conventionally disposed in the handheld housing 11. The television reception assembly includes a conventional TV receiver 30 being conventionally disposed in the handheld housing 11 for receiving television signals through the antenna 19 with the television signals being conventionally transformed into pictures which are displayed upon the display screen 17. The television reception assembly also includes television operation and control switches such as a TV connect switch 31, a channel selector switch 32 and a volume control switch 33 being conventionally disposed upon the handheld housing 11 and being conventionally connected to the TV receiver 30 and to the display screen 17. The television reception assembly further includes a VCR jack 34 being conventionally disposed through one of the walls 13 of the handheld housing 11 and being conventionally connected to the microprocessor 23 for receiving input from a remote video recorder device, and also includes a CD player jack 35 also being conventionally disposed through one of the walls 13 of the handheld housing 11 and being conventionally connected to the microprocessor 23 for receiving input from a remote CD player device.

In use, the user can watch television programs upon the display screen 17 using the television operation and control switches 31–33, and can switch to the cell phone by using the function switches 27 and the phone connect switch 28, and when finished talking on the phone, the user can switch back to watching television programs by using the phone disconnect switch 29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the portable television/cellular phone device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable television/cellular phone device comprising:
a handheld housing having front, back, top, and side walls;
a housing support member being hingedly attached to said handheld housing for standing up said handheld housing upon a surface, said housing support member being generally a lever being hingedly attached to said back wall of said handheld housing;
a display screen being disposed upon said front wall of said handheld housing;
a phone reception/transmission assembly being disposed in said handheld housing and including a power supply being replaceably disposed in said handheld housing and also including an antenna being attached to said handheld housing, said phone reception/transmission assembly further including a numbers/symbols keypad being disposed upon said front wall of said handheld housing and including a plurality of button-like switches used to dial a phone number, said phone reception/transmission assembly also including a power switch being movably disposed through one of said walls of said handheld housing and being connected to said power supply which is a battery pack, and further including a microprocessor being disposed in said handheld housing and being connected to said numbers/symbols keypad and to said power switch and to said power supply and to said display screen upon which data is displayed, and also including a receiver including a speaker being disposed in said handheld housing for receiving radio waves through said antenna, and further including a transmitter being disposed in said handheld housing for transmitting radio waves through said antenna, and also including indicator lights being disposed upon said display screen and upon said handheld housing for indicating power level for said battery pack and also displaying incoming calls, said phone reception/transmission assembly also including function switches being disposed upon said handheld housing and being connected to said microprocessor for selecting various telephone functions programmed in said microprocessor including caller ID, and further including a phone connect switch being disposed upon said handheld housing and being connected to said receiver and said transmitter for receiving and transmitting phone calls, and also including a phone disconnect switch being connected to said receiver and said transmitter for disconnecting phone calls; and a television reception assembly being disposed in said handheld housing.

2. A portable television/cellular phone device as described in claim 1, wherein said television reception assembly includes a conventional TV receiver being disposed in said handheld housing for receiving television signals through said antenna with the television signals being conventionally transformed into pictures which are displayed upon said display screen.

3. A portable television/cellular phone device as described in claim 2, wherein said television reception assembly also includes television operation and control switches such as a TV connect switch, a channel selector switch and a volume control switch being disposed upon said handheld housing and being connected to said TV receiver and to said display screen.

4. A portable television/cellular phone device as described in claim 3, wherein said television reception assembly further includes a VCR jack being disposed through one of said walls of said handheld housing and being connected to said microprocessor for receiving input from a remote video recorder device, and also includes a CD player jack also being disposed through one of said walls of said handheld housing and being connected to said microprocessor for receiving input from a remote CD player device.

* * * * *